United States Patent
Hernandez et al.

(10) Patent No.: US 8,925,979 B2
(45) Date of Patent: Jan. 6, 2015

(54) COMMAND LATCH AND PIN LATCH SYSTEM

(75) Inventors: Manuel Andres Hernandez, Temecula, CA (US); Thomas J. Helsley, Long Beach, CA (US); Timothy S. Rozema, Ladera Ranch, CA (US)

(73) Assignee: Hartwell Corporation, Placentia, CA (US)

( * ) Notice: Subject to any disclaimer, the term of this patent is extended or adjusted under 35 U.S.C. 154(b) by 1392 days.

(21) Appl. No.: 11/944,801

(22) Filed: Nov. 26, 2007

(65) Prior Publication Data

US 2008/0129056 A1 Jun. 5, 2008

Related U.S. Application Data

(60) Provisional application No. 60/868,010, filed on Nov. 30, 2006.

(51) Int. Cl.
| | |
|---|---|
| *E05C 19/10* | (2006.01) |
| *E05C 19/14* | (2006.01) |
| *E05B 63/14* | (2006.01) |
| *B64D 29/06* | (2006.01) |
| *E05B 53/00* | (2006.01) |
| *E05B 63/12* | (2006.01) |
| *E05B 63/00* | (2006.01) |

(52) U.S. Cl.
CPC ............... *E05C 19/14* (2013.01); *E05B 63/143* (2013.01); *B64D 29/06* (2013.01); *E05B 53/005* (2013.01); *E05B 63/122* (2013.01); *E05B 2063/0026* (2013.01); *Y10S 292/31* (2013.01)
USPC ........................ 292/98; 292/113; 292/DIG. 31

(58) Field of Classification Search
USPC .............................. 292/98, 113, DIG. 31, 109
See application file for complete search history.

(56) References Cited

U.S. PATENT DOCUMENTS

| 1,426,122 A | 8/1922 | Stern |
|---|---|---|
| 1,768,021 A | 6/1930 | Bauerband |

(Continued)

FOREIGN PATENT DOCUMENTS

| CH | 676832 A5 | 3/1991 |
|---|---|---|
| DE | 3707323 A1 | 9/1988 |

(Continued)

OTHER PUBLICATIONS

Partial European Search Report issued in application No. EP07291414.6 (2011).

(Continued)

*Primary Examiner* — Mark Williams
(74) *Attorney, Agent, or Firm* — Barnes & Thornburg LLP

(57) ABSTRACT

A latching system for releasably securing a first member to a second member in a closed position. The latching system includes a command latch assembly comprising a hook latch assembly including a handle selectively moveable from a first handle position toward a second handle position and a hook member adapted to selectively engage a first keeper when the handle is in the first handle position and to disengage from the first keeper when the handle is moved to the second handle position. The latching system also includes a remotely located slave latch assembly comprising a pin latch assembly adapted to secure a second keeper to the pin latch assembly when the handle of the hook latch assembly is in the first handle position and to disengage the second keeper when the handle of the hook latch assembly is moved to the second handle position.

10 Claims, 10 Drawing Sheets

(56) References Cited

U.S. PATENT DOCUMENTS

| | | | |
|---|---|---|---|
| 2,216,367 A | 10/1940 | Hoblick | |
| 2,752,183 A | 6/1956 | Franz | |
| 3,754,224 A | 8/1973 | Roy et al. | |
| 3,765,196 A | 10/1973 | Balicki | |
| 4,075,878 A | 2/1978 | Best | |
| 4,318,557 A | 3/1982 | Bourne et al. | |
| 4,421,349 A | 12/1983 | Greiert | |
| 4,531,769 A | 7/1985 | Glancy | |
| 4,549,708 A | 10/1985 | Norris | |
| 4,743,052 A | 5/1988 | Stammreich et al. | |
| 4,768,815 A | 9/1988 | Harmon | |
| 4,858,970 A | 8/1989 | Tedesco et al. | |
| 5,096,236 A | 3/1992 | Thony | |
| 5,152,559 A | 10/1992 | Henrichs | |
| 5,172,945 A | 12/1992 | Doherty et al. | |
| 5,560,232 A | 10/1996 | Chen | |
| 5,568,740 A | 10/1996 | Lin | |
| 5,620,212 A | 4/1997 | Bourne et al. | |
| 5,984,382 A | 11/1999 | Bourne et al. | |
| 5,992,187 A | 11/1999 | Derman | |
| 6,026,664 A | 2/2000 | Lin | |
| 6,036,238 A | 3/2000 | Lallament | |
| 6,068,305 A | 5/2000 | Myers et al. | |
| 6,095,573 A | 8/2000 | Rozema | |
| 6,116,663 A | 9/2000 | Robert | |
| 6,123,370 A | 9/2000 | Rozema | |
| 6,151,755 A | 11/2000 | Rozema | |
| 6,279,971 B1* | 8/2001 | Dessenberger, Jr. | 292/113 |
| 6,325,428 B1 | 12/2001 | Do | |
| 6,343,815 B1* | 2/2002 | Poe | 292/113 |
| 6,457,336 B1 | 10/2002 | Bremicker | |
| 6,508,086 B2 | 1/2003 | Chen | |
| 6,866,226 B2 | 3/2005 | Pratt et al. | |
| 6,866,227 B2 | 3/2005 | Pratt et al. | |
| 6,913,297 B2 | 7/2005 | Jackson et al. | |
| 6,923,027 B1 | 8/2005 | Kuo | |
| 7,131,672 B2 | 11/2006 | Pratt et al. | |
| 7,185,926 B2* | 3/2007 | Helsley et al. | 292/113 |
| 7,252,311 B2* | 8/2007 | Pratt et al. | 292/113 |
| 7,255,376 B2 | 8/2007 | Pratt et al. | |
| 7,513,133 B2 | 4/2009 | Muerza | |
| 7,578,475 B2 | 8/2009 | Pratt et al. | |
| 7,882,941 B2 | 2/2011 | Rozema | |
| 2002/0073747 A1 | 6/2002 | Chen | |
| 2004/0012212 A1* | 1/2004 | Pratt et al. | 292/341.16 |
| 2005/0235710 A1* | 10/2005 | Ling | 70/58 |
| 2006/0038410 A1 | 2/2006 | Pratt et al. | |
| 2007/0169523 A1 | 7/2007 | Lu | |

FOREIGN PATENT DOCUMENTS

| | | |
|---|---|---|
| DE | 29514280 U1 | 11/1995 |
| EP | 0431769 | 6/1991 |
| EP | 0839714 | 5/1998 |
| FR | 2726600 | 5/1996 |
| GB | 594198 | 11/1947 |
| GB | 2161532 A | 1/1986 |
| WO | WO 2006/004942 | 1/2006 |
| WO | WO 2006/033929 | 3/2006 |

OTHER PUBLICATIONS

Search Report issued in Application No. EP07291414.6 (Oct. 2, 2014).

* cited by examiner

COMMAND LATCH AND PIN LATCH SYSTEM

RELATED APPLICATIONS

This application claims the benefit of U.S. Provisional Application No. 60/868,010, filed Nov. 30, 2006.

BACKGROUND

The present disclosure relates to a latching system for releasably securing a first member to a second member in a closed position, and in particular to a latching system including a command latch adapted to operate a remotely located slave latch.

Many types of latches are used in connection with aircraft to releasably secure two members or structures of the aircraft together in a closed position, such as the housing portions of an engine nacelle. Such latches are subjected to substantial forces during use while securing two aircraft members together in a closed position. Aircraft latches must also prevent inadvertent opening of the latch that could be caused by vibratory or other forces applied to the latch. Aircraft latches are sometimes located in substantially inaccessible locations making direct manual operation of the latch between closed and open positions difficult if not impossible. Aircraft latches are sometimes also located in blind locations such that a latch cannot be visually inspected to confirm it is properly closed and securing two aircraft members together in a closed position.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

SUMMARY

A latching system for releasably securing a first member to a second member in a closed position. The latching system comprises a command latch assembly operatively coupled to a remotely located slave latch assembly. The command latch assembly comprises a hook latch assembly adapted to be attached to the first member and a first keeper adapted to be attached to the second member. The hook latch assembly includes a handle selectively manually movable from a first handle position toward a second handle position, and a hook member adapted to selectively engage the first keeper when the handle is in the first handle position and to disengage from the first keeper when the handle is moved to the second handle position.

The slave latch assembly comprises a pin latch assembly adapted to be attached to the first member and a second keeper adapted to be attached to the second member. The pin latch assembly includes a pin selectively movable between a retracted position and an extended position. The pin is adapted to releasably secure the second keeper to the pin latch assembly when the pin is in the extended position. A safety gate is movable from a first position, wherein the safety gate prevents movement of the pin to the extended position, to a second position, wherein the safety gate does not prevent movement of the pin to the extended position, by insertion of the second keeper into a receptacle of the pin latch assembly. A coupler member has a first end operatively associated with the handle of the hook latch assembly and a second end operatively associated with the pin of the pin latch assembly such that selective movement of the handle of the hook latch assembly is adapted to move the pin of the pin latch assembly between the extended and retracted positions of the pin.

DETAILED DESCRIPTION

Figure 1:
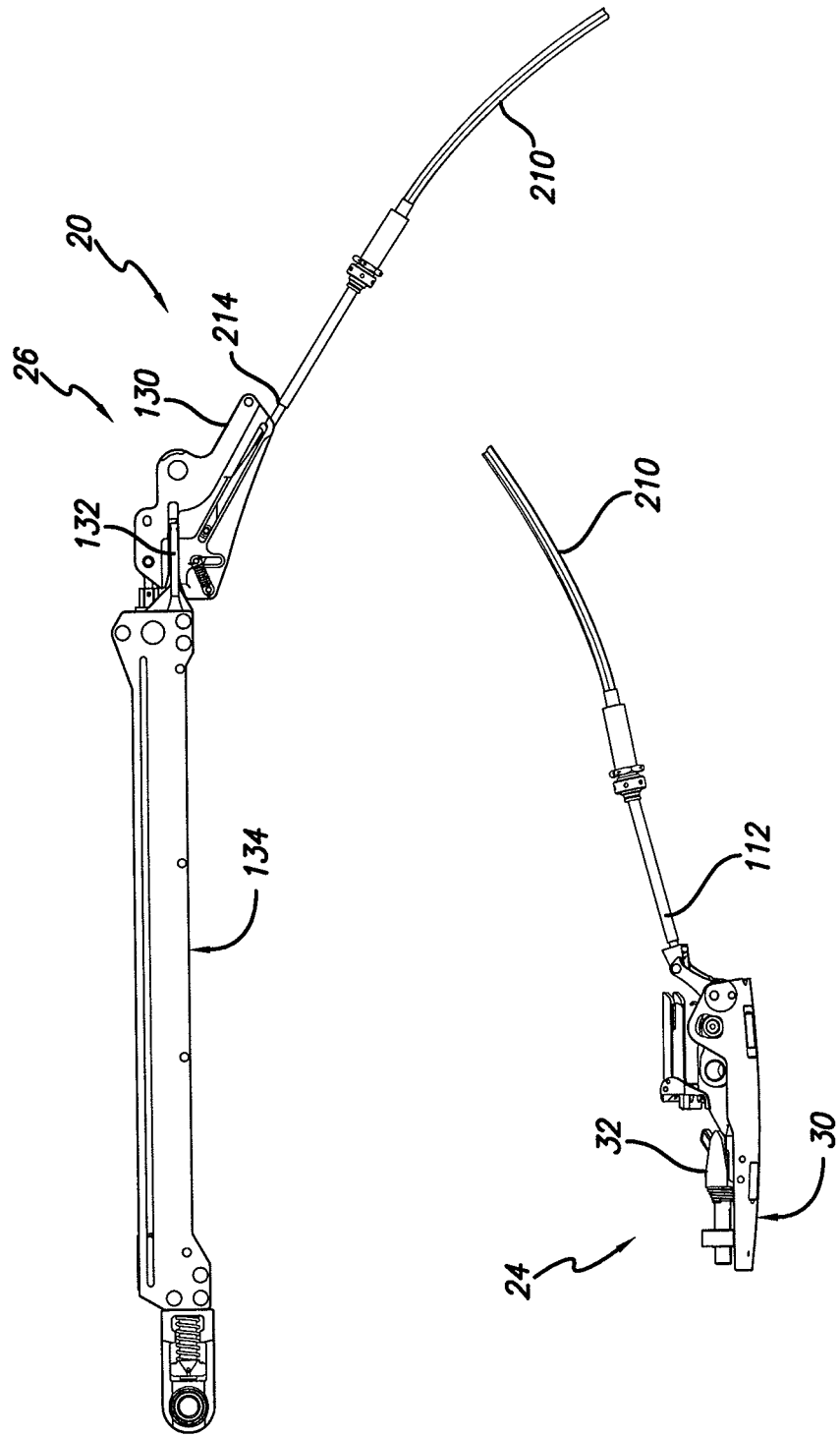
FIG. 1 is a front elevational view of a latching system in accordance with an embodiment of the present disclosure.

While the present disclosure may be susceptible to embodiment in different forms, there is shown in the drawings, and herein will be described in detail, an embodiment with the understanding that the present description is to be considered an exemplification of the principals of the disclosure and is not intended to limit the disclosure to the details of construction, methods and arrangements of components set forth in the following description or illustrated in the drawings.

The present disclosure is directed to a latching system for releasably securing a first member to a second member in a closed position, such as members or portions of an aircraft. The aircraft may be in the form of a plane, jet, helicopter or any other aerospace vehicle. The first and second members that are held in the closed position may include any suitable members or structures of an aircraft configured to be closed or otherwise secured together.

Figure 2:
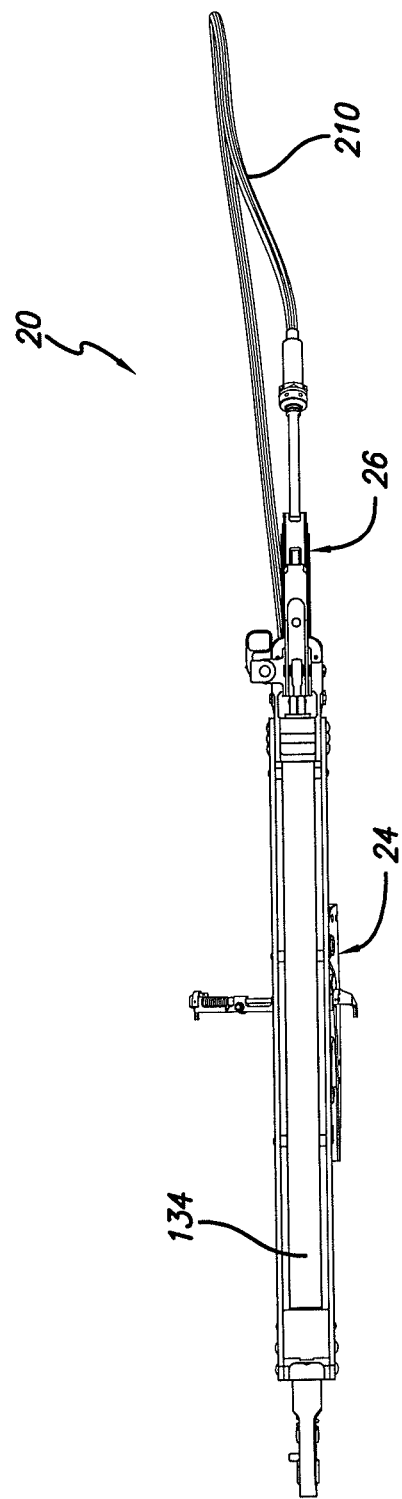
FIG. 2 is a top view of the latching system.
Figure 3:
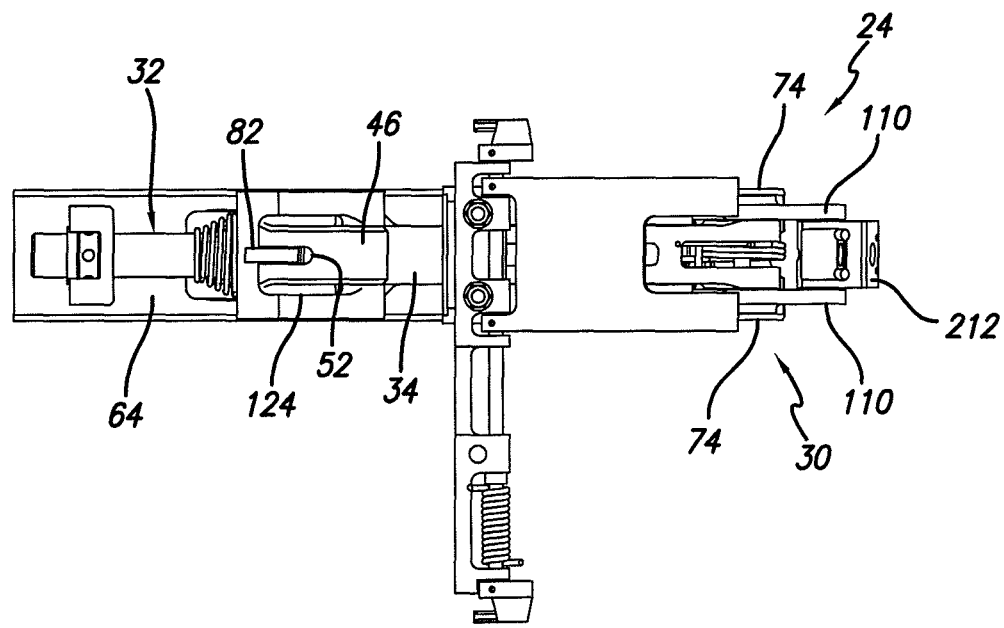
FIG. 3 is a top view of the command latch assembly.

FIGS. 1 and 2 show a latching system 20 in accordance with an embodiment of the present disclosure for securing first and second members of an aircraft engine housing in a secured and closed position. The latching system 20 includes a command latch assembly 24 and a remotely located slave latch assembly 26.

The command latch assembly 24 includes a hook latch assembly 30 and a keeper 32. The hook latch assembly 30 is adapted to be coupled to the first member of the aircraft and the keeper 32 is adapted to be coupled to the second member of the aircraft. The hook latch assembly 30 includes an elongate hook member 34 having a first end 36, second end 38 and a longitudinal axis 40. The hook member 34 includes an elongate slot 42 extending along the longitudinal axis 40 and extending through the side walls of the hook member 34. The second end 38 of the hook member 34 includes a hook formed by an inwardly extending open-end slot 44 and a finger 46. The second end 38 of the hook member 34 also includes an end wall 48 and an outwardly extending lip 50. A channel 52 extends through the second end 38 of the hook member 34 between the end wall 48 and a top wall 54. The hook member 34 also includes upper and lower apertures 56 and 58 that are in communication with the elongate slot 42. The first end 36 of the hook member 34 includes a pair of spaced apart lugs 60.

Figure 9:
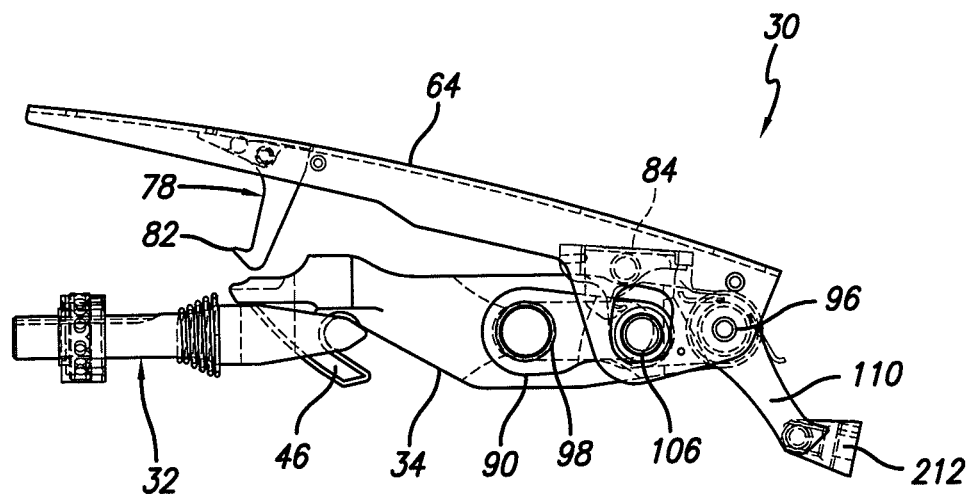
FIG. 9 is a side elevational view of the command latch assembly with the handle shown in an intermediate partially open position.

The hook latch assembly 30 also includes a handle 64 having a first end 66 and a second end 68. The first end 66 of the handle 64 is pivotally coupled to the first end 36 of the hook member 34 by one or more connector members 70, such as for example a pin, shaft, or fastener, for pivotal movement about an axis 72 that is generally transverse to the axis 40. The handle 64 includes a pair of spaced apart and generally parallel wing walls 74 each of which includes a respective aperture 76. Each wing wall 74 is pivotally coupled to the first end 36 of the hook member 34 by respective connector members 70. A first trigger 78 is pivotally attached to the top wall 80 of the handle 64 and is located adjacent the second end 68 of the handle 64. The first trigger 78 includes an actuator pad 79 pivotally attached to the handle 64 and an arm extending outwardly from the actuator pad 79 to a finger 80 that is adapted to releasably engage the keeper 32 when the handle 64 and trigger 78 are in their closed positions. A second trigger 84 is pivotally attached to the top wall 80 of the handle 64 adjacent the first end 66. The second trigger 84 includes an actuator pad 85 pivotally attached to the handle 64 and an arm extending outwardly from the actuator pad 85 having an outwardly extending finger 86 that is adapted to releasably engage the hook member 34 when the handle 64 is in an intermediate open position, as shown in FIG. 9, and the second trigger 84 is in a closed position. Each of the actuator pads 79 and 85 of the triggers 78 and 84 is manually accessible through respective apertures in the top wall 80 of the handle 64 such that each trigger 78 and 82 may be manually pivoted from a closed position to an open position. A resilient biasing member 88, such as a spring, resiliently biases the handle 64 from the closed position toward the open position. Each trigger 78 and 84 includes a resilient biasing member, such as a spring, for resiliently biasing the trigger from the open position toward the closed position.

The hook latch assembly 30 also includes an over-center linkage 90 located on each side of the hook member 34. If desired, only one over-center linkage may be used. Each over-center linkage 90 includes a first end 92 and a second end 94. The first end 92 of the over-center linkage 90 is pivotally coupled to the first end 36 of the hook member 34 and to the first end 66 of the handle 64 by a connector member 96, such as a pin, shaft or fastener. The second end 94 of the over-center linkage 90 is pivotally coupled to the hook member 34 by a connector member 98, such as a pin, shaft or fastener, having a central axis 100. The connector member 98 extends through the slot 42 of the hook member 34 and is adapted to be coupled to the first member of the aircraft. The over-center linkage 90 includes a first link 102 and a second link 104. The first link 102 is located at the first end 92 of the linkage 90 and is pivotally coupled to the hook member 34 for pivotal movement about the axis 72. The second link 104 is pivotally coupled to the hook member 34 by the connector member 98 for pivotal movement about the axis 100. The first link 102 is pivotally coupled to the second link 104 by a center connector member 106 having a central axis 108. The center connector member 106 of each over-center linkage 90 extends into the aperture 76 of a respective wing wall 74 of the handle 64. An arm 110 extends outwardly from each first link 102 to a distal end 112.

Figure 4:
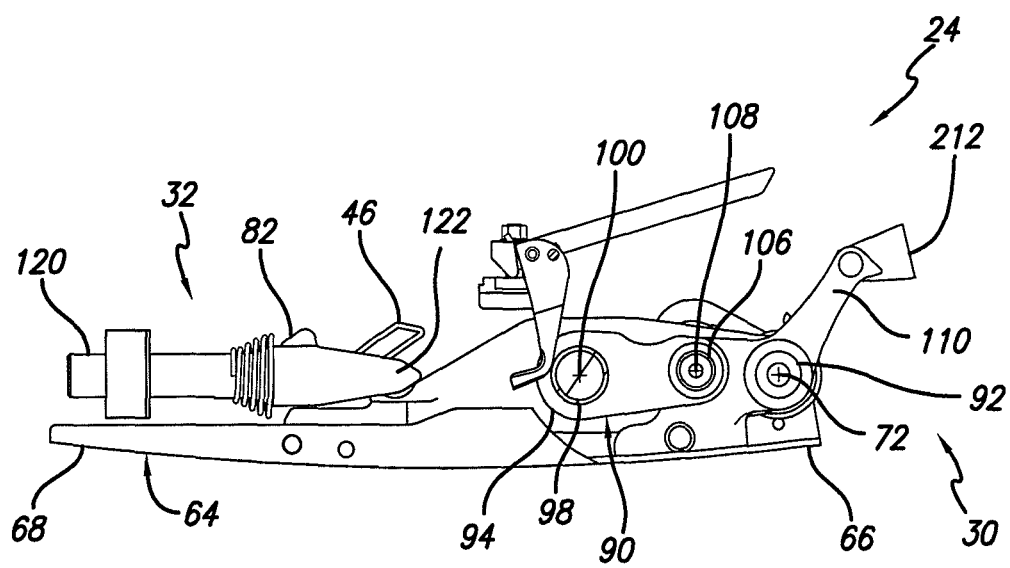
FIG. 4 is a partial side elevational view of the command latch assembly in the closed position.
Figure 7:
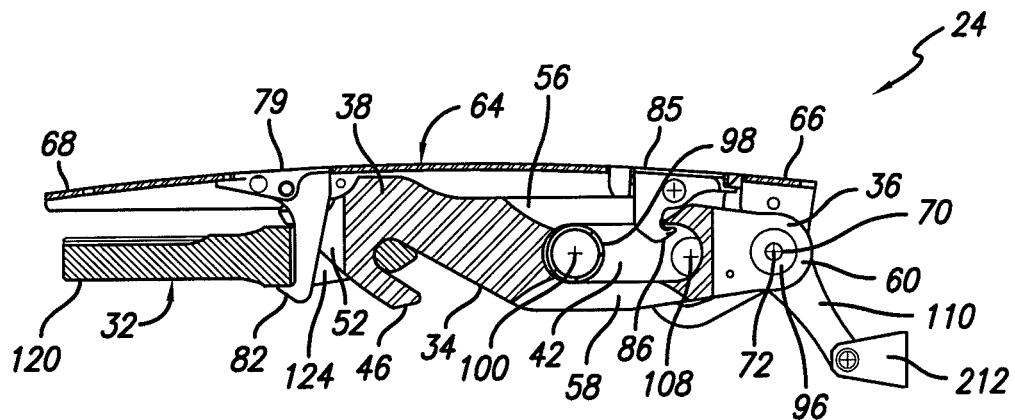
FIG. 7 is a cross sectional view taken along line 7-7 of FIG. 6.
Figure 8:
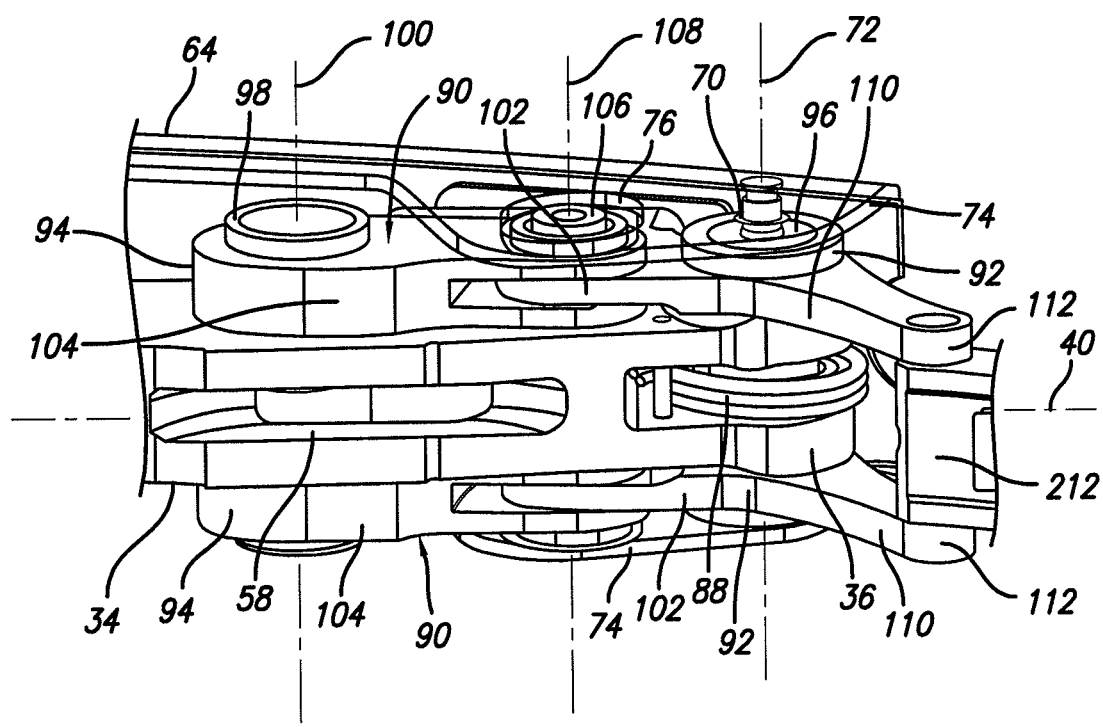
FIG. 8 is a partial perspective view of the hook latch assembly of the command latch assembly.

The keeper 32 includes a first end 120, a second end 122, and an aperture 124 at the second end 122. The first end 120 of the keeper 32 is adapted to be attached to the second member of the aircraft. As shown in FIGS. 4 and 7, when the handle 64 is in the closed position, the finger 46 of the hook member 34 extends through the aperture 124 in the keeper 32 such that the tip of the keeper 32 is located within the slot 44 of the hook member 34 whereby the hook latch assembly 30 and keeper 32 securely hold the first and second members of the aircraft in the closed position. When the handle 64 is in the closed position, the arm of the first trigger 78 extends through the channel 52 in the second end 38 of hook member 34 and through the aperture 124 in the keeper 32 such that the trigger 82 releasably engages the keeper 32 and prevents the handle 64 from moving toward the open position shown in FIG. 5.

Figure 5:
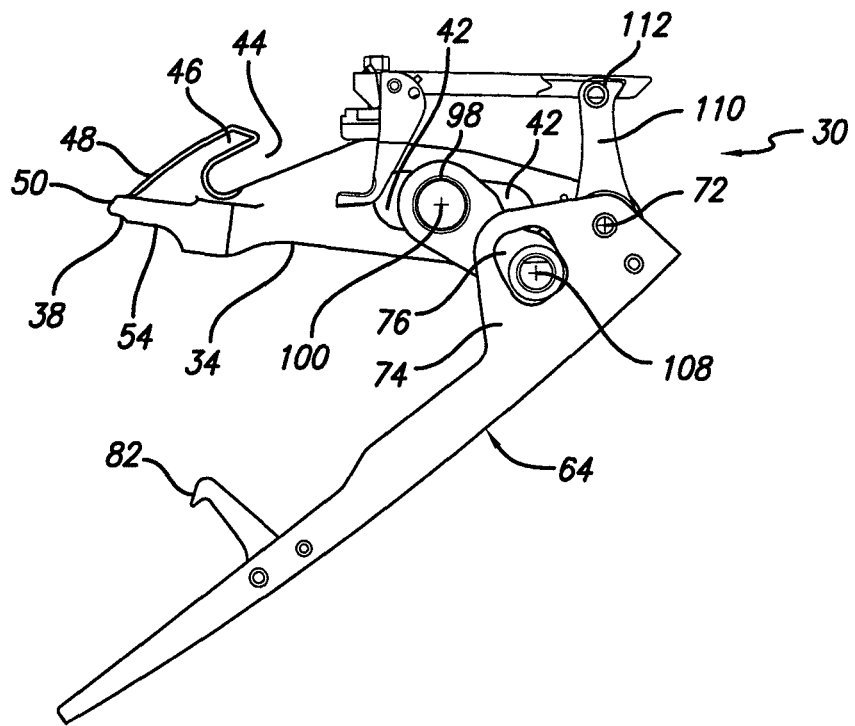
FIG. 5 is a side elevational view of the hook latch assembly of the command latch assembly shown in the open position.
Figure 6:
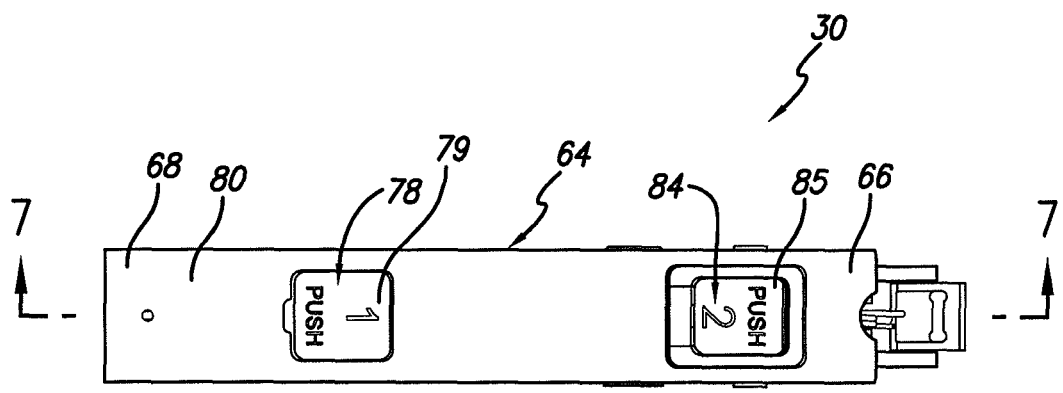
FIG. 6 is a bottom view of the command latch assembly.

When the first trigger 78 is manually actuated, the finger 78 pivots out of engagement with the keeper 32 such that the handle 64 may pivot about the axis 72 with respect to the hook member 34 and the over-center linkages 90 to an intermediate open position as shown in FIG. 9 wherein the finger 86 of the second trigger 84 engages the hook member 34 to prevent further movement of the handle 64 toward the open position. Manual actuation of the second trigger 84 will pivot the finger 86 of the second trigger 84 out of engagement with the hook member 34, such that the handle 64 may be manually moved from the intermediate open position as shown in FIG. 9 to a fully open position as shown in FIG. 5 and as shown in phantom lines in FIG. 10.

As the handle 64 is manually moved from the intermediate open position to the fully open position, the wing walls 74 of the handle 64 engage the center connector members 106 of the over-center linkages 90 and move the connector members 106 outwardly from their locked over-center position, as shown in FIG. 7, to an unlocked position wherein the hook member 34 will slide with respect to the connector member 98 from a position wherein the connector member 98 is located at a distal end of the slot 42 to a position wherein the connector member is located at a proximal end of the slot 42. The hook member 34 will also simultaneously pivot about the axis of 100 of the connector member 98 such that the hook member 34 will disengage from the keeper 32. As the handle 64 pivots from the intermediate open position to the fully open position and the center connector members 106 of the over-center linkages 90 move from the locked position to the unlocked position, the arms 110 and links 102 pivot about the axis 72.

Figure 13:
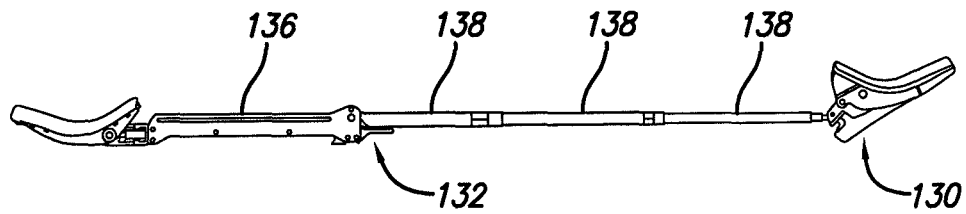
FIG. 13 is a perspective view of the slave latch assembly and strut assembly shown in the fully open position.
Figure 14:
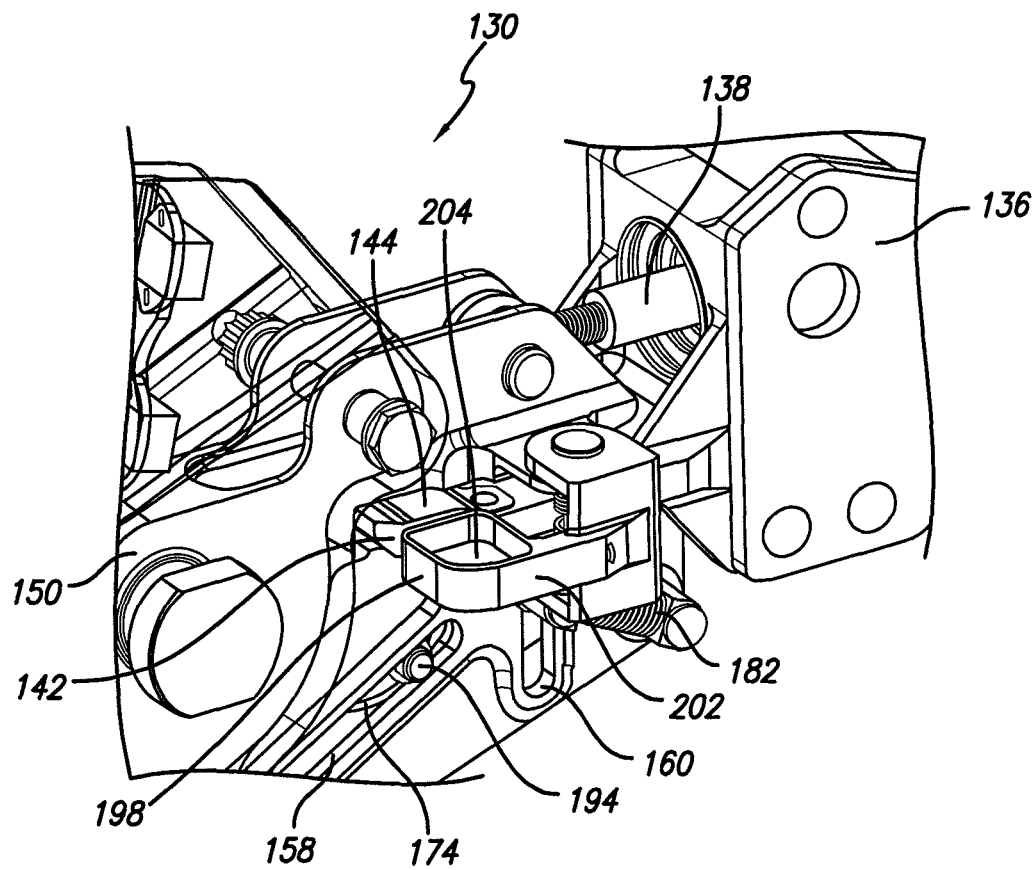
FIG. 14 is a perspective view of a portion of the slave latch assembly and strut assembly shown in the closed position.

The slave latch assembly 26 includes a pin latch assembly 130 and a keeper 132. The pin latch assembly 130 may be coupled to the first member of the aircraft and the keeper 132 may be coupled to the second member of the aircraft. As shown in FIG. 13, if desired, the slave latch assembly 26 may include an extendable and retractable strut assembly 134. The strut assembly 134 includes a fixed strut 136 having a first end adapted to be attached to the second member of the aircraft with the keeper 132 attached to a second end of the fixed strut 136. The strut assembly 134 also includes a plurality of extendable and retractable struts 138 that may be arranged in a telescoping arrangement and that are adapted to extend generally linearly outwardly from the second end of the fixed strut 136. The distal end of the extendable and retractable struts 138 may be coupled to the pin latch assembly 130. The extendable and retractable struts 138 are selectively collapsible such that the pin latch assembly 130 may releasably engage the keeper 132 to the secure the first and second aircraft members in a closed position.

Figure 16:
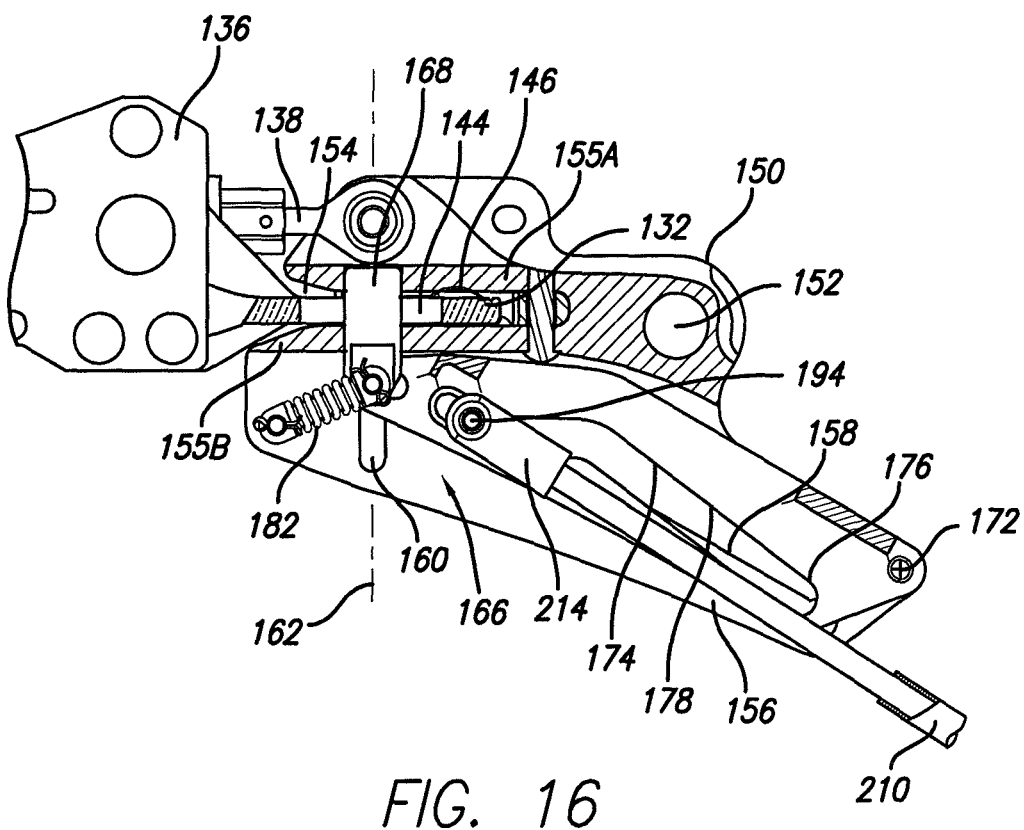
FIG. 16 is a cross sectional view of the slave latch assembly and strut assembly in the closed position.

As shown in FIG. 16, the keeper 132 includes a generally planar plate-like tongue 142 having an aperture 144. A resilient biasing member 146, such as a spring or bent plate, is attached to the top surface of the tongue 142.

Figure 15:
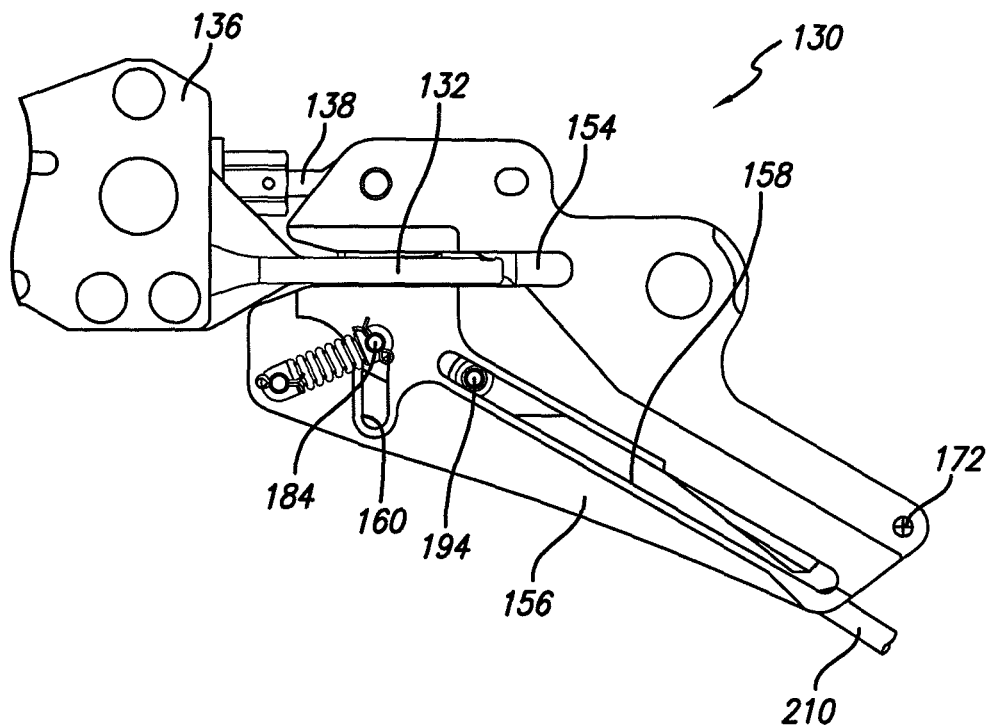
FIG. 15 is a side elevational view of the slave latch assembly and strut assembly in the closed position.
Figure 17:
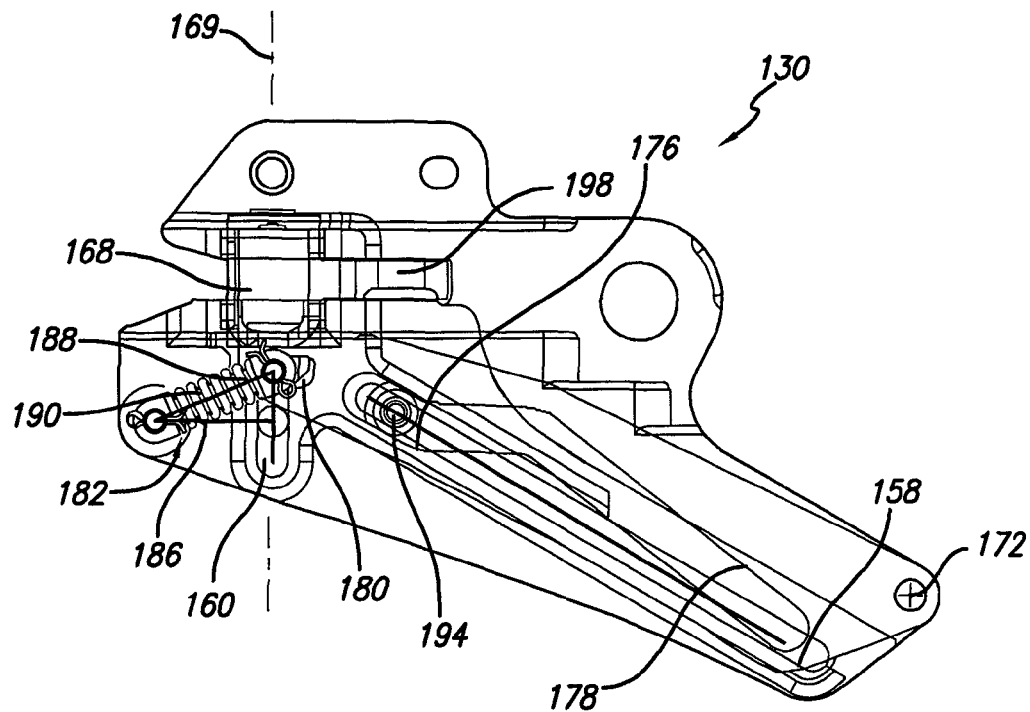
FIG. 17 is a side elevational view of the pin latch assembly of the slave latch assembly shown in the closed position.
Figure 18:
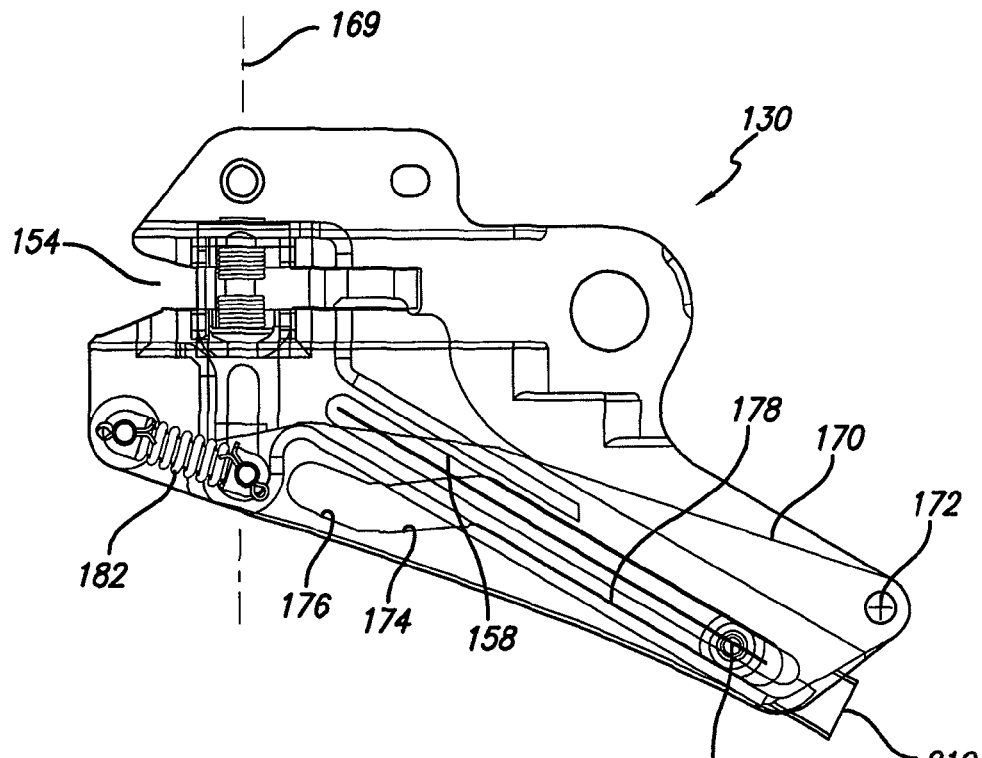
FIG. 18 is a side elevational view of the pin latch assembly of the slave latch assembly shown in the open position.

The pin latch assembly 130 includes a body 150 having an aperture 152 adapted to couple the body 150 to the first member of the aircraft. The telescoping struts 138 of the strut assembly 134 may also be coupled to the body 150. The body 150 includes a female receptacle 134, formed between upper and lower jaws 155A-B, that is adapted to removably receive the tongue 142 of the keeper 132. The biasing member 146 of the tongue 142 is adapted to engage the upper jaw 155A to prevent vibration of the tongue 142 within the receptacle 134. The body 150 also includes a pair of spaced apart and generally parallel sidewalls 156. Each sidewall 156 includes a generally linear elongate slot 158 extending from a first end of the body 150 toward a second end of the body 150. Each sidewall 156 of the body 150 also includes a relatively short linear slot 160 that extends from adjacent the bottom end of the sidewall 156 toward the receptacle 154 along an axis 162. A locking pin 168 is located between the sidewalls 156 and is selectively movable along its central longitudinal axis 169 between an extended or locked position, as shown in FIGS. 15-17, and a retracted or unlocked position as shown in FIG. 18.

The pin latch assembly 130 also includes a cam assembly 166. The cam assembly 166 includes a cam member 170 having a first end pivotally attached to the body 150 for pivotal movement with respect to the body 150 about an axis 172. The second end of the cam member 170 is pivotally coupled to the bottom end of the pin 168. The cam member 170 includes a non-linear camming slot 174 that extends from the first end of cam member 170 toward the second end of the cam member 170. The camming slot 174 includes a first generally linear slot segment 176 and a second generally linear slot segment 178 that is offset from the first slot segment 176. If desired, the cam member 170 may include a linear slot and each of the side walls 156 may include a camming slot.

The cam assembly 166 also includes one or more resilient linear biasing toggle mechanisms 182 having a first end pivotally attached to the body 150 and a second end pivotally coupled to the bottom of the pin 68 and to the second end of the cam member 170 by a connector member 184, such as a pin, shaft or fastener. The connector member 184 extends between the toggle mechanisms 182 on each side of the body 150, through the linear slots 160 in each side wall of the body 150, and through a slot 180 in the second end of the cam member 170. Each toggle mechanism 182 may include a generally helical coil spring 186 that extends around a piston 188 that is extendable and retractable within a sleeve 190. When the pin 168 is in the extended or locked position as shown in FIG. 17, the toggle mechanisms 182 resiliently bias the pin 168 toward the extended pin position. When the pin 168 is in the retracted or unlocked position the toggle mechanisms 182 resiliently bias the pin 168 toward the retracted pin position. The cam assembly 166 also includes an actuator member 194 that extends through the linear slots 158 in the side walls 156 of the body 150 and through the camming slot 174 in the cam member 170. The actuator member 194 is selectively slideable along the length of the slots 158 and 174.

When the pin 168 is in the extended or locked position, as shown in FIG. 16, the pin 168 extends through apertures in the jaws 155A-B, through the receptacle 154 and through the aperture 168 in the keeper 132 to thereby secure the keeper 132 to the pin latch assembly 130 and secure the second member of the aircraft to the first member of the aircraft in a closed position. When the pin 168 is moved from the extended position to the retracted position as shown in FIG. 18 the pin 168 does not extend into the receptacle 154 such that the tongue 142 of the keeper 132 may be selectively inserted or removed from the receptacle 154.

Figure 11:
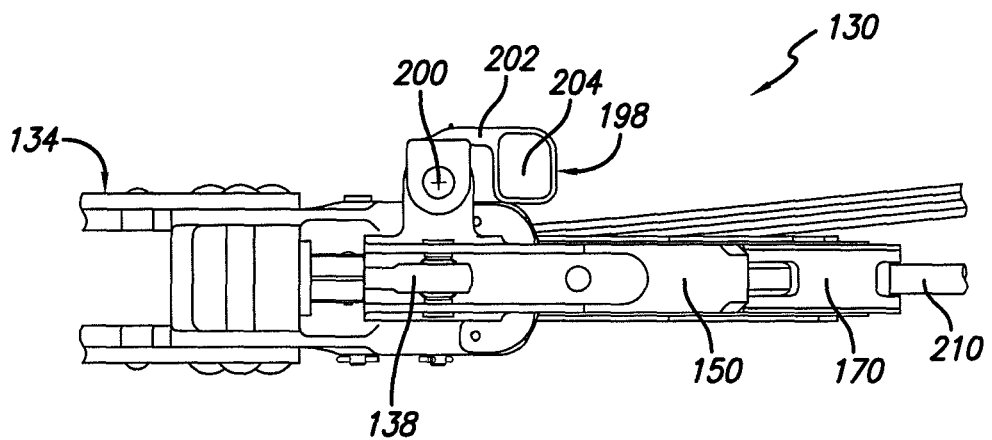
FIG. 11 is a top view of the slave latch assembly.
Figure 12:
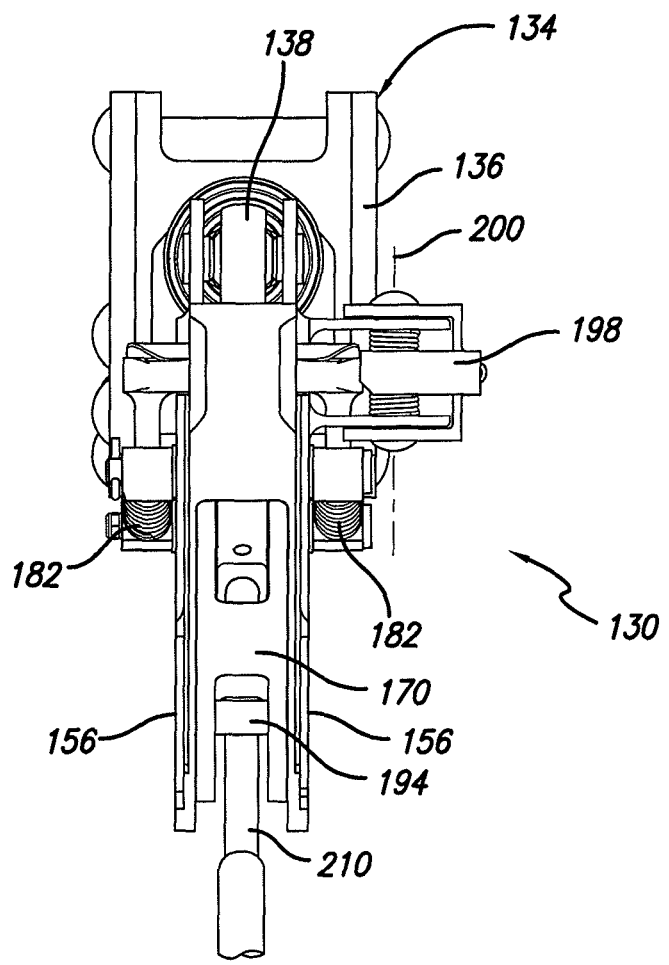
FIG. 12 is a right side view of the slave latch assembly.

The pin latch assembly 130 also includes a safety gate 198 pivotally attached to the body 150 for pivotal movement about an axis 200. The safety gate 198 includes an arm 202 pivotally attached to the body 150 and a barrier member 204 attached to the outer end of the arm 202. The safety gate 198 is adapted to be resiliently biased by a biasing member, such as a spring, from a retracted position as shown in FIG. 11, wherein the barrier member 204 is located outside of the receptacle 154, toward an extended position wherein the barrier member 204 is located within the receptacle 154. When the barrier member of the safety gate 198 is located within the receptacle 154, the barrier member 204 is aligned along the axis 169 of the pin 168 and will block and prevent movement of the pin 168 from the retracted pin position toward the extended pin position. When the safety gate 198 and barrier member 204 are located outside of the receptacle 154 in the retracted position, the safety gate 198 will not prevent movement of the pin 168 from the retracted pin position to the extended pin position. The safety gate 198 is pivoted from the extended position to the retracted position by insertion of the tongue 142 of the keeper 132 into the receptacle 154. The safety gate 198 thereby prevents movement of the pin 168 from the retracted pin position to the extended pin position unless the tongue 142 of the keeper 132 is properly located within the receptacle 154, such that the pin 168 may secure the keeper 132 to the pin latch assembly 130 when the pin 168 is moved to the extended pin position.

The latching system 20 also includes a coupler member 210, such as, for example, a push-pull cable, having a first end 212 and a second end 214. The first end 212 includes a coupling attachment structure for joining the coupler (push-pull cable or the like) to the arms 110. The first end 212 of the coupler member 210 is operatively coupled to the distal ends 112 of the arms 110 of the over-center linkages 90 of the hook latch assembly 30. The second end 214 of the coupler member 210 is operatively coupled to the actuator member 194 of the pin latch assembly 130.

The hook latch assembly 30 is coupled to the first member of the aircraft and the keeper 32 is coupled to the second member of the aircraft in a proximal manually accessible position for manual operation by an operator. The pin latch assembly 130 is coupled to the first member of the aircraft and the keeper 132 is coupled to the second member of the aircraft in a position that is distal or remotely located from the hook latch assembly 30 and keeper 32 of the command latch assembly 24. The pin latch assembly 130 and keeper 132 of the slave latch assembly 26 may be located in a remote location that is not manually accessible by an operator, and that cannot be visually inspected when the pin latch assembly 130 and keeper 132 are secured together in a closed position.

Figure 10:
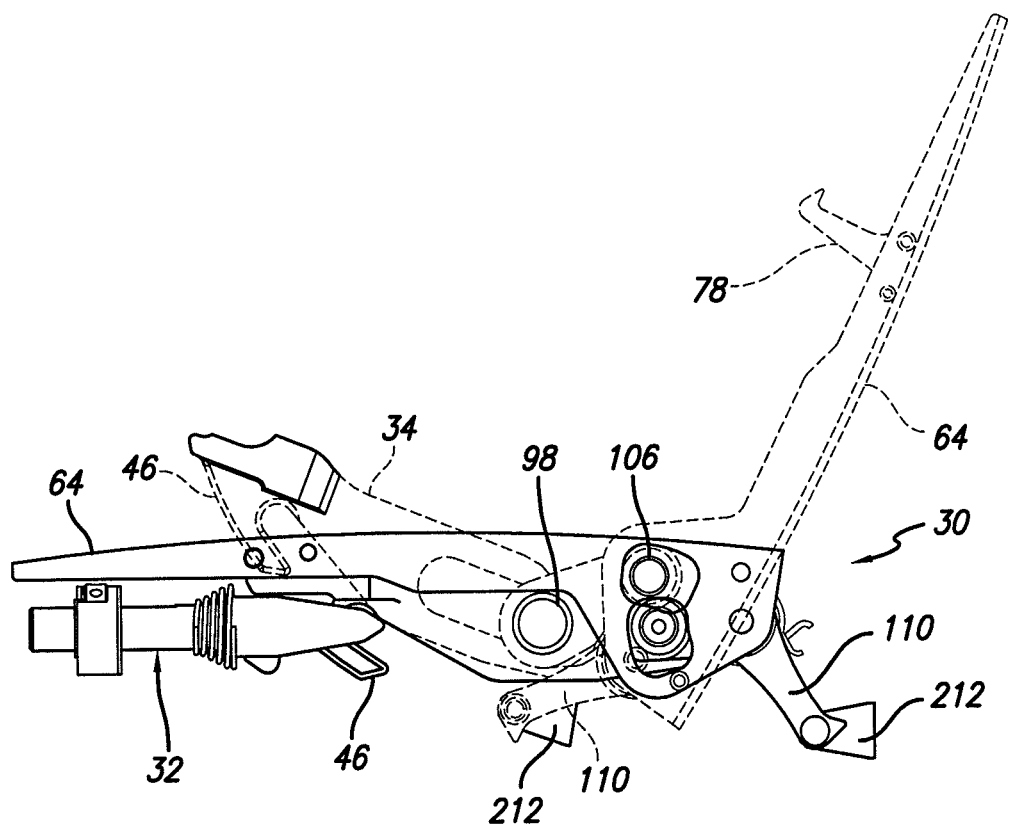
FIG. 10 is a side elevational view of the command latch assembly shown in the closed position in solid lines and in the open position in phantom lines.

As the handle 64 of the hook latch assembly 30 is moved from the intermediate open position, as shown in FIG. 9, toward the fully open position as shown in FIG. 10, the arms 110 of the over-center linkages 90 will pivot about the axis 72 and move toward the connector member 98 causing an associated movement of the first end 212 of the coupler member 210. In response to movement of the handle 64 from the intermediate open position to the fully open position and the corresponding movement of the first end 212 of the coupler member 210, the second end 214 of the coupler member 210 will move the actuator member 194 of the cam assembly 166 of the pin latch assembly 130 from its closed position within the first segment 176 of the camming slot 174, wherein the pin 168 is in the extended locked position as shown in FIG. 17, to a position located within the second segment 178 of the camming slot 174 as shown in FIG. 18.

As the actuator member 194 slides along the camming slot 174 from the first segment 176 toward the second segment 178, and also along the slots 158 of the body 150, the actuator member 194 pivots the cam member 170 from the locked position as shown in FIG. 17 to the open position as shown in FIG. 18, while simultaneously moving the pin 168 from the extended pin position as shown in FIG. 17 to the retracted pin position as shown in FIG. 18, whereupon the keeper 132 is released from the pin latch assembly 130. Thus movement of the handle 64 from the closed handle position to the fully open handle position by an operator will release the hook member 34 of the hook latch assembly 30 from the keeper 32, and will remotely release the pin 168 of the pin latch assembly 130 from the keeper 132 such that the first and second members of the aircraft are no longer secured together in a closed position.

The respective opening of the command latch assembly 24 and slave latch assembly 26 may be timed such that the pin 168 of the pin latch assembly 130 moves to the retracted open position prior to the complete disengagement of the hook member 34 of the hook latch assembly 30 from the keeper 32. The timing of the opening of the slave latch assembly 26 with respect to the command latch assembly 24 may be controlled and selected by proper selection of the length of the finger 46 of the hook member 44. Once the keeper 132 is released from the pin latch assembly 130, the struts 138 of the strut assembly 134 may be extended to separate the first and second members of the aircraft from one another. Although the strut assembly 134 continues to couple the first aircraft member to the second aircraft member when the strut assembly 134 is in the extended position, the first and second aircraft members are not secured together in a closed position by the pin latch assembly 130 and keeper 132.

When it is desired to secure the first and second aircraft members together in a closed position, the first and second aircraft members are manually moved to the closed position whereupon, the tongue 142 of the keeper 132 is inserted into the receptacle 154 of the pin latch assembly 132 and pivots the safety gate 198 to the retracted position out of the receptacle 154. An operator may then move the handle 64 of the hook latch assembly 130 from the fully open position toward the closed position. As the handle 64 is moved toward the closed handle position the hook member 34 will engage the keeper 32. Movement of the handle 64 toward the closed position also pivots the arms 110 of the over-center linkages 90 about the axis 72 and moves the arms 110 away from the connector member 98. Movement of the distal ends 112 of the arms 110 causes an associated movement of the actuator member 194 of the pin latch assembly 130 through the coupler member 210. As the handle 64 moves from the fully open position toward the closed position, the actuator member 194 will move along the slots 158 of the body 150 and the camming slot 174 from a position in the second segment 178 of the camming slot 174 to a position within the first segment 176 of the camming slot 174 as shown in FIG. 17. The actuator member 194 will thereby cause the cam member 170 to pivot about the axis 172 from the open position as shown in FIG. 18 to the locked position as shown in FIG. 17, and will move the pin 168 along the axis 169 from the retracted pin position to the extended locked pin position wherein the pin 168 extends through the aperture 144 in the keeper 132. The pin latch assembly 130 and keeper 132 are secured together in a closed position by remote operation of the handle 64 of the hook latch assembly 30.

If, when the first and second members of the aircraft are positioned in the closed position for securement together, the tongue 142 of the keeper 132 is not located within the receptacle 154, the safety gate 198 will remain in the receptacle 154 to prevent movement of the pin 168 from the retracted pin position, to the extended pin position and will through the coupler member 210 prevent movement of the handle 64 of the hook latch assembly 30 from the fully open position toward the closed position. An operator will thereby be signaled that the pin latch assembly 130 and keeper 132 are not properly aligned and are not secured together in a closed position, without any need for the operator to visually inspect the pin latch assembly 130 and keeper 132. Operation of the handle 64 of the hook latch assembly 30 thereby provides proximal latching and unlatching, or closing and opening, of the hook latch assembly 30 and keeper 32 of the command latch assembly 24 and remote latching and unlatching of the pin latch assembly 130 and keeper 132 of the slave latch assembly 26, while also providing verification of proper latching of the keeper 132 to the pin latch assembly 130. The safety gate 198 prevents a false indication that the tongue 142 of the keeper 132 is properly positioned within the receptacle 154 for securement to the pin latch assembly 132 by the pin 168.

While embodiments have been illustrated and described in the drawings and forgoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

What is claimed is:

1. A command latch assembly for releasably securing a first member to a second member in a closed position and for actuating a remotely located slave latch, the command latch assembly comprising:

a hook latch assembly adapted to be attached to the first member and including a handle having a first end and a second end, a hook member having a first end coupled to the first end of the handle and a second end including a hook, an over-center linkage having a first end coupled to the first end of the hook member and a second end adapted to be coupled to the first member, and an arm attached to the over-center linkage, the arm adapted to be coupled to the remotely located slave latch; and a keeper adapted to be attached to the second member, the hook member adapted to selectively engage the keeper when the handle is in a first handle position and to disengage from the keeper when the handle is moved to a second handle position;

whereby the arm of the hook latch assembly includes a coupler for connection to a slave latch such that movement of the handle of the hook latch assembly between the first and second handle positions is operative to actuate the remotely located slave latch; and wherein the coupler comprises a first end including a coupling attachment structure for joining the coupler to the arm.

2. The command latch assembly of claim 1 wherein the handle, hook member and arm are each adapted to pivot about a common axis.

3. The command latch assembly of claim 1 wherein the hook member includes a longitudinal slot, and a connector member is coupled to the second end of the over-center linkage and extends through the longitudinal slot in the hook member, the connector member adapted to be coupled to the first member.

4. The command latch of claim 1 wherein the over-center linkage includes a first link pivotally coupled to the first end of the hook member, a second link adapted to be coupled to the first member, and a center connector pivotally coupling the first link to the second link, the handle including a wing wall having an aperture, the center connector being located within the aperture of the wing wall such that the wing wall is adapted to engage the center connector when the handle is moved between the first and second handle positions.

5. A command latch assembly for releasably securing a first member to a second member in a closed position, the command latch comprising:

a keeper adapted to be attached to the second member;

a hook latch assembly adapted to attached to the first member and including a handle having a first end and a second end, a hook member having a first end coupled to the first end of the handle and a second end including a hook adapted to releasably engage the keeper, the handle being movable between a first handle position wherein the hook member engages the keeper and a second handle position wherein the hook member is disengaged from the keeper, the handle including a first trigger adapted to releasably engage the keeper when the handle is in the first handle position to prevent movement of the handle toward the second handle position, and the handle including a second trigger adapted to releasably engage the hook member when the handle is in an intermediate position between the first handle position and the second handle position to prevent movement of the handle to the second handle position; and wherein the first and second triggers each include an actuator pad pivotally attached to the handle and a finger attached to the actuator pad by an arm, the handle including a first aperture for providing manual access to the actuator pad of the first trigger and a second aperture for providing manual access to the actuator pad of the second trigger.

6. The command latch assembly of claim 5 wherein the second trigger is located between the first trigger and the first end of the handle.

7. A command latch assembly for releasably securing a first member to a second member in a closed position and for actuating a remotely located slave latch, the command latch comprising:

a keeper adapted to be attached to the second member;

a hook latch assembly adapted to attached to the first member and including a handle having a first end and a second end, a hook member having a first end coupled to the first end of the handle and a second end including a hook adapted to releasably engage the keeper, the handle being movable between a first handle position wherein the hook member engages the keeper and a second handle position wherein the hook member is disengaged from the keeper, the handle including a first trigger adapted to releasably engage the keeper when the handle is in the first handle position to prevent movement of the handle toward the second handle position, and the handle including a second trigger adapted to releasably engage the hook member when the handle is in an intermediate position between the first handle position and the second handle position to prevent movement of the handle to the second handle position;

the first and second triggers each include an actuator pad pivotally attached to the handle and a finger attached to the actuator pad by an arm, the handle including a first aperture for providing manual access to the actuator pad of the first trigger and a second aperture for providing manual access to the actuator pad of the second trigger;

an over-center linkage having a first end coupled to the first end of the hook member and a second end adapted to be coupled to the first member, an aim attached to the over-center linkage; and whereby the arm of the hook latch assembly is adapted to be coupled to the remotely located slave latch such that movement of the handle of the hook latch assembly between the first and second handle positions is operative to actuate the remotely located slave latch.

8. The command latch assembly of claim 7 wherein the handle, hook member and arm are each adapted to pivot about a common axis.

9. The command latch assembly of claim 7 wherein the hook member includes a longitudinal slot, and a connector member is coupled to the second end of the over-center linkage and extends through the longitudinal slot in the hook member, the connector member adapted to be coupled to the first member.

10. The command latch of claim 7 wherein the over-center linkage includes a first link pivotally coupled to the first end of the hook member, a second link adapted to be coupled to the first member, and a center connector pivotally coupling the first link to the second link, the handle including a wing wall having an aperture, the center connector being located within the aperture of the wing wall such that the wing wall is adapted to engage the center connector when the handle is moved between the first and second handle positions.

* * * * *